Patented Mar. 14, 1933

1,901,045

UNITED STATES PATENT OFFICE

OTTO SCHMIDT, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF FOILS

No Drawing. Application filed October 11, 1929, Serial No. 399,100, and in Germany November 5, 1928.

The present invention relates to the production of thin artificial masses.

It is already known that raw rubber which is not protected by the addition of special agents, decomposes and completely loses its elastic properties after some time by the action of oxygen, and that such oxidized products are completely useless for the manufacture of vulcanized rubber and other purposes.

I have found, contrary to expectation, that hard thin artificial masses of flat nature, such as films, bands, or discs, lacquer coatings and thin artificial masses of rounded cross-section, such as strings and the like, of very great flexibility, strength and low extensibility and of relatively small combustibility and great stability to water and chemical influences are obtained by treating soft films and the like of the desired form which are resilient on mechanical pressure onto their surface, prepared from synthetic polymerization products of diolefines, with oxygen, or air, or other gases containing oxygen, or agents which supply oxygen such as peroxides. The polymerization products may be highly viscous liquids or they may be solid and usually these products are employed in the process according to the present invention.

The term solid means that the said polymerization products are not liquid but that they may be elastic on bending and resilient on mechanical pressure onto their surface, and may be a little sticky at their surface. Since even the viscous polymerization products cannot be distilled without decomposition all the polymerization products will be therefore referred to as non-distillable polymerization products.

The treatment of the films and the like is suitably carried out by allowing them to stand in an atmosphere of air or oxygen, if desired with the application of superatmospheric pressure, whereat the process can be accelerated by raising the temperature, for example to about 50° centigrade or even more, warming to 100°, 140° or about 200° C. being particularly applicable and useful in the production of coatings. The temperature of warming depends to some degree on the nature of the base to be coated and must be so chosen as not to deteriorate the base. Films and the like already vulcanized in the manner usually employed for the vulcanization of raw rubber may also be employed, and these are exposed to a subsequent treatment with oxygen in accordance with the present invention. Of the various kinds of the aforesaid polymerization products those obtained from butadiene, prepared for example with the aid of sodium and/or in the presence of an organic solvent such as cyclohexane, ethyl ether or the like, are especially suitable for the preparation of the films and the like. The polymerization products obtainable by heating in the presence of aqueous solutions of an albumin in the presence of hydrogen peroxide and a retarder or in another manner may also be employed. The films can be prepared if desired with additional substances such as loading materials, inorganic or organic coloring materials, filling agents and the like, fatty acids, softening agents, or plasticizers, such as aryl-phosphates, petroleum jelly, fats, waxes, high boiling oils, paraffin oil and the like, or also India rubber or polymerization products of isomers of butadiene or of its aforesaid substitution products, for example isoprene or 2.3-dimethylbutadiene, in a quantity not exceeding that of the aforesaid polymerization products, preferably about 10 per cent by weight of the latter, and in this manner colorless, glass clear as well as colored or mottled films or coatings and the like can be obtained.

In order to produce coatings of all kinds on any convenient foundations, the colored or uncolored polymerization products are applied dispersed in an organic solvent to the article to be coated, the latter being then heated in the presence of oxygen, whereby in the first instance the solvent is evaporated and a film is formed. In this manner a tough and strongly adherent lacquer coating, distinguished by unusual elasticity and hardness, is obtained, for example from a polymerization product of butadiene. The hardness is often many times as great as that of ordinary lacquer coatings, and as a rule the coatings cannot be scratched at all by objects of medium hardness. The resistance to the influence of temperature and chemical agents being also extremely high, the quality of these coatings is considerably superior to that of most of those already known.

Particularly valuable products are obtained when the initial solutions are subjected to a very far reaching purification before their employment. This effect can be obtained by subjecting the solutions to sedimentation, centrifuging, intense filtration or to a combination of several of these steps. Thus, for example, the dilute solution of the polymerization product, for example in cyclohexane is left standing for a considerable time, whereupon the solution is separated from any particles precipitated and is centrifuged or filtered for example through linen or felt. If a further purification is required, for example when transparent foils or strings are to be produced by means of the solutions, any impurities can be removed by passing the solution through a series of wadding pads of cotton or glass wool, which purification can be further improved by passing the solution through leather, porous stone or porcelain or fritted glass, in which latter cases passing the solutions is enhanced by the application of pressure. If desired also cataphoresis can be employed.

The films and the like prepared according to this invention are elastic and flexible and after a long or vigorous treatment with oxygen no longer exhibit the typical high extensibility of rubber. They resemble, as regards their appearance, the transparent foils obtainable from cellulose or cellulose derivatives, and in contrast to these they have the advantage of being capable of being washed and of having but a small combustibility. Besides this the products obtained possess the good properties of hard rubber. Hence, it is also possible to make a kind of hard rubber without using sulphur, a consideration which is sometimes very important in connection with insulation and lining purposes, since hard rubber which has been prepared with sulphur, often in the course of time exudes small amounts of sulphur which under the influences of the atmosphere become oxidized to sulphuric acid thus rendering the surfaces of the insulation conductive, or destroying sensitive contents of vessels lined with hard rubber. On account of their being thoroughly transparent, of being easily dyed or colored, for example by means of leaf gold, and of being quite nonhygroscopic the films may find useful application for mouth-pieces for example for cigarettes and the like. The films may be employed as packing material for any purposes in the place of wrapping paper and the like. For example chemicals, chemical preparations, sweets or any foodstuffs can be securely wrapped therein and be protected from the air and bacteria also in hot and/or wet climates, and bottles of any form may be provided with capsules of the said materials. Also gun powder, shells or cartridges may be provided with a water tight wrapping, coating or lining. Similarly posters and signals may be protected from the air, rain and hail, and bodies of vehicles, such as cars, motorcars, ships, aircraft and the like, may be provided with a resistant coating which is not liable to catch fire easily. For the same reasons most valuable water and acid proof garments highly resistant to wear can be prepared from the products according to the present invention, all the aforesaid applications coming into consideration also for the products obtainable in accordance with applicant's prior applications Ser. No. 360,615 filed May 4th 1929 and 368,181 filed June 3rd, 1929.

The following examples will further illustrate the nature of this invention, but the invention is not restricted to these examples.

*Example 1*

A 3 per cent solution in cyclohexane of a polymerization product obtainable from butadiene by means of sodium is poured onto a horizontal glass plate and the film obtained after evaporation of the cyclohexane is heated in the air at a temperature of from 40° to 50° centigrade until a satisfactory hardness is attained, and then allowed to stand in the air for a long period of time. When analyzed, the product has the following composition, 75 per cent of carbon, 9.4 per cent of hydrogen and 15.6 per cent of oxygen. The film which was originally very extensible has completely lost its extensibility, but remains glass clear, transparent and flexible and has a considerable tensile strength.

*Example 2*

For the purpose of producing coatings on certain articles the articles are painted with a solution in a hydrocarbon, such as cyclohexane, of a solid product which is obtained by the polymerization of butadiene by means of sodium. By allowing the articles to lie in warm air at a temperature of from 40° to 50° centigrade for 24 hours or by allowing them to stand in an atmosphere of air or oxygen at room temperature the desired hardness of the coating is attained after about 50 hours.

*Example 3*

An unhardened film prepared in accordance with Example 1 is heated for from 10 to 16 hours at 50° to 60° C. in an atmosphere of oxygen while keeping the pressure in the reaction vessel at about 100 atmospheres. The resulting film is clear and transparent as clear glass, solid and pliable and possesses a considerable tensile strength.

In a similar manner strongly adhering coatings can be obtained on any base, which coatings are particularly resistant to chemical and physical influences. For example a solution of a solid polymerization product of butadiene in a liquid hydrocarbon, or in a chlorinated hydrocarbon, can be painted or sprayed onto the desired base, whereupon the coating is hardened in an atmosphere containing a considerable proportion of oxygen at about the temperature stated above, if desired at a pressure above atmospheric pressure.

*Example 4*

20 parts of a polymerization product obtainable according to Example 2 by polymerization of butadiene with the aid of sodium in the presence of cyclohexane are dissolved in 100 parts of cyclohexane together with 1 part of manganese linoleate or of another dryer. Articles to be coated are sprayed or painted with the solution, which may be diluted if desired before the application, and then kept in the air or in an atmosphere of oxygen for about 40 hours, if desired while warming to 40 to 50° C. for about 18 hours when air is employed. The aforesaid process is particularly advantageous for coating wood, coloring materials being added, if desired, to the solution before its application.

*Example 5*

200 parts of a polymerization product which yields solutions of medium viscosity (with a relative viscosity of a 5 per cent solution thereof in cyclohexane of about 80) and has been prepared by the action of sodium on butadiene in the presence of ethyl ether or cyclohexane, and 50 parts of very fine English red, are intimately mixed on the rollers. The mixture obtained is dispersed in 1,000 parts of a mixture of equal parts of benzene and turpentine oil in the ball mill. The colloidal solution obtained is thoroughly homogeneous; can be filtered through filter stone or fritted glass and spread so that it is particularly suitable for the production of lacquers or enamel coatings, preferably after adding a solution of 10 parts of a zinc-manganese salt of naphthenic acid and 2½ parts of aldol-α-naphthylamine. The latter coatings can be prepared, for example, by spraying a substantial layer on the articles to be enamelled, such as vessels, stirrers and the like, or bobbins employed in the manufacture of artificial silk, drying the layer and hardening it at from about 130° to 150° centigrade for several hours in the air. The aforedescribed treatment can be repeated, as desired, coatings which are very hard, strongly adherent and quite insensitive to the action of acids, alkalies, organic solvents, or other chemical agents being obtained. In comparison with coatings prepared by the usual enamelling processes the coatings prepared in the aforesaid manner possess the considerable advantages of being applicable at a very low temperature and of being highly resistant to mechanical influences and to practically all chemical influences.

By replacing the English red by another pigment, enamels with another shade can be prepared and the properties of the enamels can be varied also by employing a polymerization product of butadiene prepared in another manner than the aforesaid product.

What I claim is:—

1. The process for the production of thin artificial masses which comprises warming a soft foil of a non-distillable synthetic polymerization product of a diolefine, which is free from sulphur, in the presence of oxygen.

2. The process for the production of thin artificial masses which comprises heating a soft foil of a solid synthetic polymerization product of a diolefine, which is free from sulphur, to a temperature below 200° C. in the presence of oxygen.

3. The process for the production of thin artificial masses which comprises heating a soft foil of a solid synthetic polymerization product of a butadiene, which is free from sulphur, to a temperature below 200° C. in the presence of oxygen.

4. The process for the production of thin artificial masses which comprises heating a soft foil of a solid synthetic polymerization product of a butadiene, which is free from sulphur, conjointly with a non-distillable polymerization product of another diolefine to a temperature below 200° C. in the presence of oxygen.

5. The process for the production of thin artificial masses which comprises heating a layer of a solution of a solid synthetic polymerization product of a butadiene which is free from sulphur, to a temperature below 200° C. in the presence of oxygen.

6. The process for the production of thin artificial masses which comprises heating a layer of a solution of a solid synthetic polymerization product of a butadiene which is free from sulphur, and of a non-distillable polymerization product of another diolefine to a temperature below 200° C. in the presence of oxygen.

7. The process for the production of thin artificial masses which comprises heating a soft foil of a mixture comprising a solid synthetic polymerization product of a butadiene, which is free from sulphur, and a filling material to a temperature below 200° C. in the presence of oxygen.

8. The process for the production of thin artificial masses which comprises heating a soft foil of a hardened solid synthetic polymerization product of a diolefine, which is free from sulphur, to a temperature below 200° C. in the presence of oxygen.

9. The process for the production of thin artificial masses which comprises heating a soft foil of a solid synthetic polymerization product of a diolefine, which is free from sulphur, to a temperature between 40° and 200° C. in the presence of oxygen.

10. The process for the production of thin artificial masses, which comprises heating a soft foil of a solid synthetic polymerization product of a diolefine, which is free from sulphur, to a temperature between 40° and 200° C. in the presence of oxygen, at a pressure up to about 100 atmospheres.

11. As new articles of manufacture thin artificial masses which are insoluble in practically all chemical agents and organic solvents, possess a high flexibility but at the most a slight extensibility and comprise a product obtainable by heating a soft foil of a non-distillable synthetic polymerization product of a butadiene, which is free from sulphur, to a temperature below 200° C. in the presence of oxygen.

12. As new articles of manufacture hard films which are insoluble in practically all chemical agents and organic solvents, possess a high flexibility but at the most a slight extensibility and comprise a product obtainable by heating a solution of a solid synthetic polymerization product of a butadiene, which is free from sulphur, to a temperature below 200° C. in the presence of oxygen.

In testimony whereof I have hereunto set my hand.

OTTO SCHMIDT.